INVENTOR
Augustin Serra
By
B. Singer, Atty

Feb. 5, 1924.

A. SERRA

WARP KNIT FABRIC AND METHOD OF MAKING SAME

Filed Dec. 5, 1923   8 Sheets-Sheet 3

INVENTOR
Augustin Serra
By
B. Singer, Atty.

A. SERRA 1,482,705

WARP KNIT FABRIC AND METHOD OF MAKING SAME

Filed Dec. 5, 1923     8 Sheets-Sheet 6

Fig. 13.

INVENTOR
Augustin Serra
By
B. Singer, Atty

Fig. 17.

Patented Feb. 5, 1924.

1,482,705

UNITED STATES PATENT OFFICE.

AUGUSTIN SERRA, OF ESSOMES-SUR-MARNE, FRANCE.

WARP KNIT FABRIC AND METHOD OF MAKING SAME.

Application filed December 5, 1923. Serial No. 678,787.

*To all whom it may concern:*

Be it known that I, AUGUSTIN SERRA, a French subject, of Essomes-sur-Marne, Aisne, France, manufacturer, have invented certain new and useful Improvements in Warp Knit Fabrics and Methods of Making Same, of which the following is a specification.

This invention relates to a method of and means for the manufacture of an improved knitted fabric, and it relates more particularly to a longitudinal warp knitted fabric of the type produced on warp knitting machines, for example Milanese silk. Milanese silk is a knitted fabric which is commonly used for the manufacture of underclothing and the like; it is elastic in one direction only, and is generally closely knitted from very solid threads of first quality.

The light and semi-transparent fabrics used at the present time for the manufacture of stockings have hitherto been produced with a different mesh and have possessed the great disadvantage of "laddering," which is the term commonly applied to the unravelling or coming apart of the whole length of the fabric if a single stitch is broken.

Now the fabric produced according to the present invention although transparent is unladderable, by which is meant that if one or a plurality of stitches are broken or torn, the fabric will still be held together by the surrounding stitches, and the tear will not be substantially enlarged by a mere unravelling of further stitches. The improved fabric is light, is elastic in two directions, and it can be produced at a low cost price. The knitting machine and the method of operating the threads therein, which forms the subject of the present invention, enables yarns to be used which are useless for the production of Milanese silk fabrics, such fabrics as stated above, always requiring the employment of very solid threads with short stitches which are relatively non-transparent, and of threads of the finest quality especially when the gauge is fine.

In many knitted fabrics actually known, the stitch remains loose, that is to say at the nodes or points of intersection the threads are not tightened together, which is one of the reasons why when a tear is made it has a tendency to enlarge by unravelling or laddering.
In a fabric made according to the present invention, each individual thread is formed into a series of closed loops a plurality of loops intermesh at the nodes, and the threads are pulled tightly together at the nodes. The threads used are preferably twisted left hand, as I find that a fabric made from threads so twisted is more uniform than one formed from threads having a right-hand twist, as is the usual practice.

The tightening of the threads at the nodes is obtained by causing the fabric to be pulled on the needles, contrary to the usual practice with warp knitting machines, in which the fabric is always loosely suspended. To obtain a high degree of transparency, the length of thread fed per stitch is made greater than usual, this is obtained by giving the guide wires a greater vertical movement than that required merely to pass the threads over the needles. Otherwise the machine works in the usual manner; the two sets of parallel threads are threaded through the eyes of the guide wires fixed to two carriers, the two carriers being moved up and down simultaneously, but are "shogged" off oppositely in the direction of the width of the fabric, in a manner well known in warp knitting machines.

The present invention is a continuation in part of my co-pending application for Letters Patent of the United States "Improvements in method and means for the manufacture of knitted fabric," filed December 11, 1922, Serial No. 606,223.

I append drawings illustrating my invention by way of example, as applied to a rectilinear knitting machine.

Figure 1:
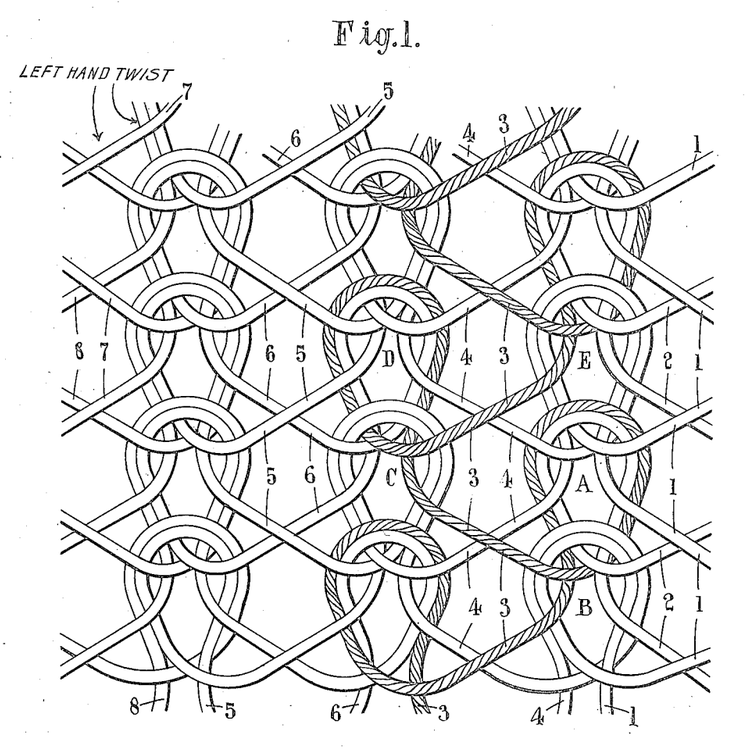
Fig. 1 is a diagrammatic view, on an enlarged scale, of the fabric made according to the present invention.

Referring to Fig. 1, the threads marked by the odd numbers 1, 3, 5, are threaded through the eyes of one set of guide wires J, fixed to the carrier $j$. Those marked by the even numbers 2, 4, 6, are threaded through the eyes of the other set of guide wires K fixed to the carrier $k$. Following one of the threads, say that marked 3, it is seen that it is formed into a series of closed loops. At the node A it intermeshes with the threads 1, 2, and 4; at the node B it intermeshes with the threads 1, 2, and 4; at the node C it intermeshes with the threads 4, 5, and 6; at the node D it intermeshes with the threads 4, 5, and 6. Thus the thread 3 intermeshes directly with the five threads 1, 2, 4, 5, and 6. The full course of the thread 3 throughout the fabric is made up of repetitions of the element between the nodes B and E, the node E being exactly similar to the node B. The nodes or stitches are all pulled together tightly as described hereinafter, thus ensuring that in the event of a thread breaking at any point its ends are held tightly by five other threads, so that laddering is effectively prevented. In order to show clearly the intermeshing of the various threads, the tightening of the nodes is not shown in the drawing. Between the nodes the fabric may be made of open texture as shown, so that transparency may be given as desired.

Figure 2:
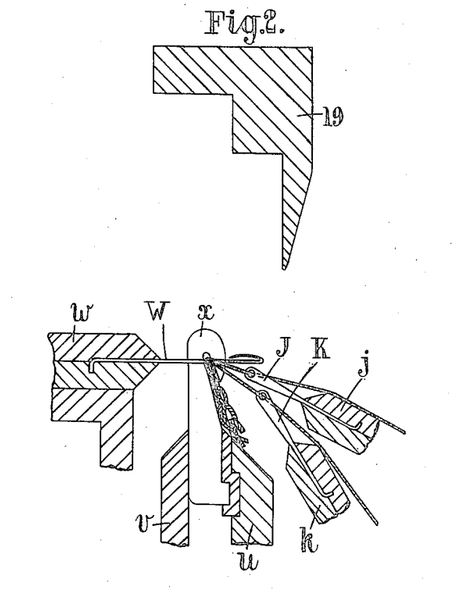
Figs. 2 to 6 are diagrammatic views in side elevation showing a cycle of relative positions of the threads, needles, sinkers, guide wires and pressers at five different instants during the formation of a row of stitches.
Figure 6:
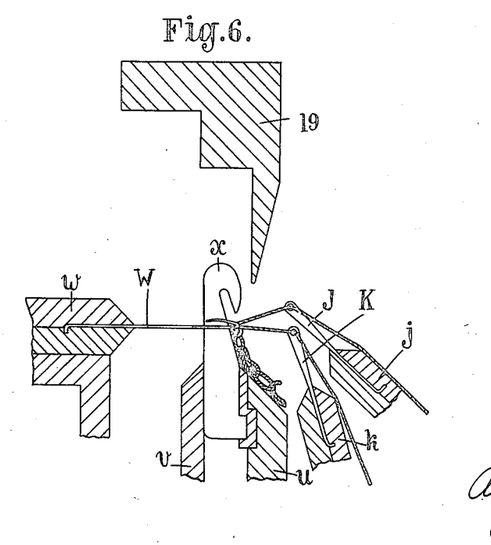
Figure 7:
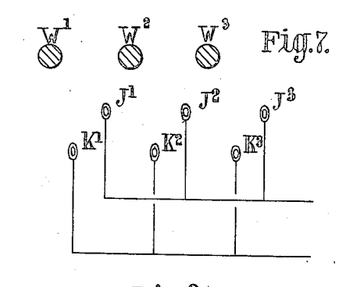
Figs. 7-11 are diagrammatic views in front of the needles corresponding to Figs. 2-6.

Referring now to Figs. 2–11, $w$ designates the needle carriers, in which are fixed the needles W. The needle carriers are fixed and bolted to the frame of the machine. In Figs. 2 and 7, the sinker carriers $v$ $u$ to which are fixed the sinkers $x$, are at a certain distance from the frame the presser 19 is raised clear of the needles, and the guide wires are at their lowest position.

Figure 3:
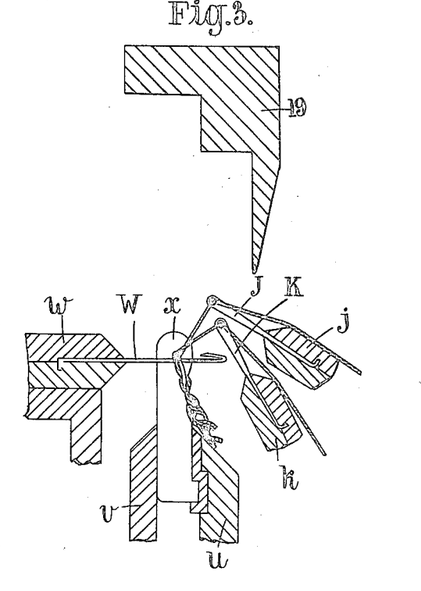
Figure 8:
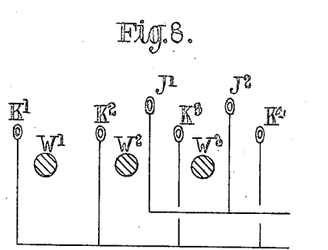

After a fraction of a turn of the motor shaft, the members are in the position shown in Figs. 3 and 8. The sinker carriers $u$ $v$ and the presser have not moved from their positions as shown in Fig. 2 but the guide wires are raised. At the position of Figs. 3 and 8, the guide wires have been "shogged," that is moved transveresly by means of the arrangement shown in Fig. 17, which is described hereinafter. Relatively to the observer in Fig. 3, J has approached and K receded, for a distance corresponding to the space between two consecutive needles W, or (which amounts to the same thing) between two sinkers $x$, since one needle is placed between each sinker.

Figure 4:
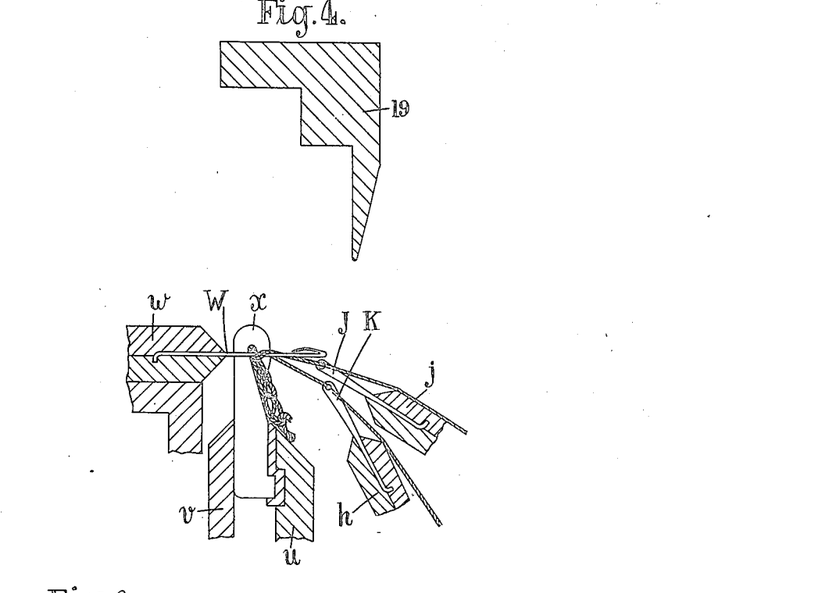
Figure 5:
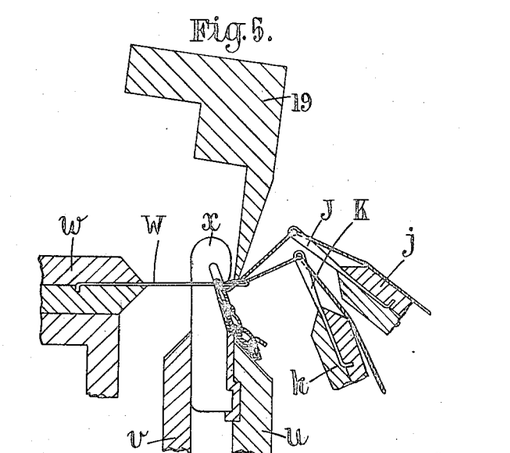
Figure 9:
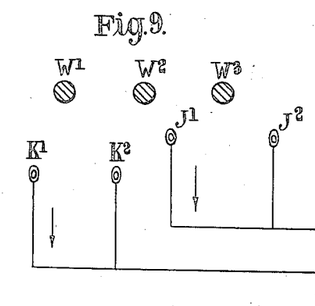
Figure 10:
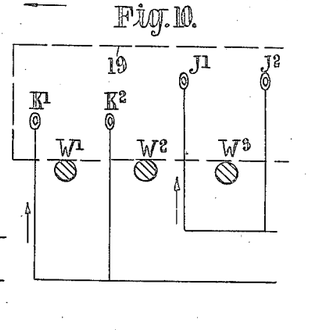
Figure 11:
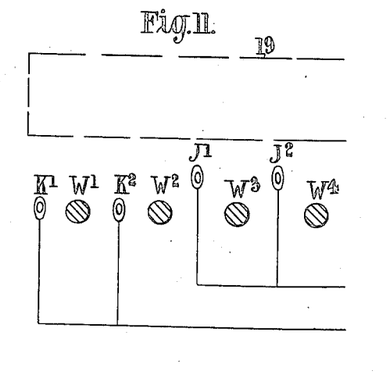

The movement continuing, the sinker carriers $u$ $v$ draws slightly nearer to the frame of the machine, and the guide wires descend, bringing the threads below the level of the needles as shown in Figs. 4 and 9. Here it is to be observed that if the individual needle W is the same in both Figs. 3 and 4, then the individual guide wires J and K shown in Fig. 4 are different from those shown in Fig. 3, owing to the said lateral displacement of the guide wire carriers.

The sinker carrier $v$ $u$ then begins to move away from the frame as the presser 19 is lowered and presses the needles W. At this instant the sinker carrier is raised together with the guide wires (Figs. 5 and 9) but the stitches cannot leave the needles since the presser 19 presses on the threads and the stitches which have just been formed.

The sinkers are completely disengaged from the threads and the sinker carrier continues to move away from the frame of the machine. The beards of the needles being kept closed by the presser, the said movement of the sinker carrier knocks over the stitches from the needles, and the presser being raised and the guide wires descending and being shogged in the opposite direction to that which gave the position shown in Figs. 3 and 8, the position shown in Figs. 6 and 9 is reached.

In the movement thus far described, the threads passing through the eyes of the guide wires $J_1$, $J_2$, $J_3$, have been passed over and under the needles $W_2$, $W_3$, $W_4$ respectively while the threads passing through the eyes of the guide wires $K_1$, $K_2$, $K_3$ have been passed over and under the needles $W_1$, $W_2$, $W_3$, respectively and a row of stitches has been formed. In the formation of the next row of stitches, the up and down movement of the guide wires and their movements of approaching and receding from the needles takes place exactly as described with reference to Figs. 2–11, but the shogging movements of the guide wires at the various phases are in the opposite directions to those described, that is the threads passing through the eyes of the guide wires $J^1$, $J^2$, $J^3$, are passed over and under the needles $W^1$, $W^2$, $W^3$, respectively, while the threads passing through the eyes of the guide wires $K^1$, $K^2$, $K^3$, are passed over and under the needles $W^2$, $W^3$, $W^4$, respectively.

It is to be observed that the travel of the guide wires in their elevating movements (Figs. 3 and 5) is greater than would be necessary if it were desired merely to pass the threads over the needles. This is for the purpose of exerting a tension on the threads and pulling them tightly together at the nodes of the fabric, and of feeding a length of the thread to give the desired length of mesh between the nodes.

It is also to be observed that the sinker carrier plates $u$, $v$, have a movement of considerable amplitude relatively to the machine both vertically and horizontally. These movements are effected by the mechanism hereinafter set forth.

The said tension on the threads and the longitudinal tension applied to the web of fabric as it is formed and wound on the roller, as referred to hereinafter, is of course accompanied by a tension on the threads passing transversely from needle to needle during the formation of the rows of stitches. When the stitches are knocked off from the needles, the transverse tension on the fabric gradually becomes less and less as the rows of stitches move away from the needles. Therefore the width of the web of completed fabric is very considerably less than that at the needles during the formation of the stitches. Accordingly the fabric is very extensible laterally; it can be stretched to the full width it originally had at the needles without any relative displacement of the threads where they intermesh at the nodes. When the web of fabric is removed from the roller on which it is wound in the machine, and the longitudinal tension is thereby removed, the fabric contracts longitudinally, and can again be stretched to its original length without relative displacement of the threads where they intermesh at the nodes. Thus the fabric is slightly elastic longitudinally, and highly elastic laterally. This property renders the fabric particularly adaptable for the manufacture of stockings and other underclothing.

Figure 12:
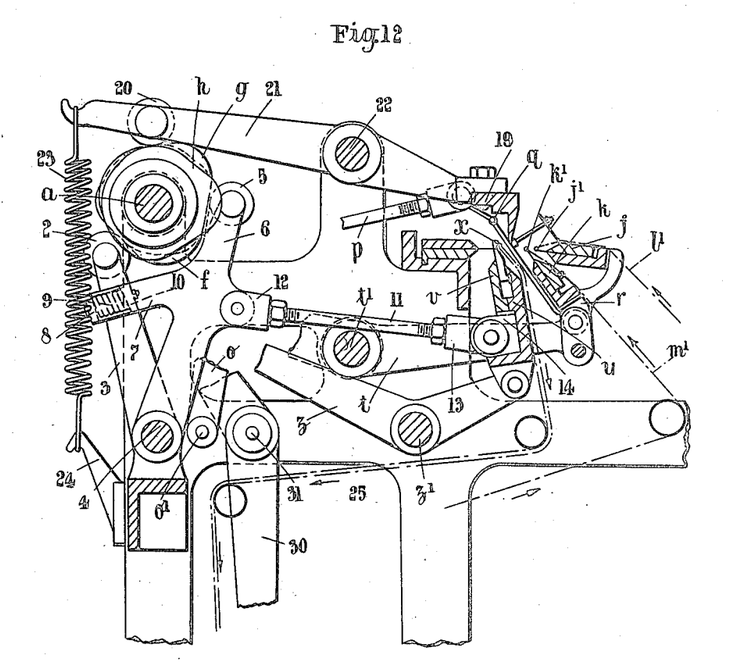
Fig. 12 is a partial cross section of the machine, showing the actuating device of the presser, and the device for effecting the up-and-down movement of the plates which hold the two sets of guide wires.
Figure 13:
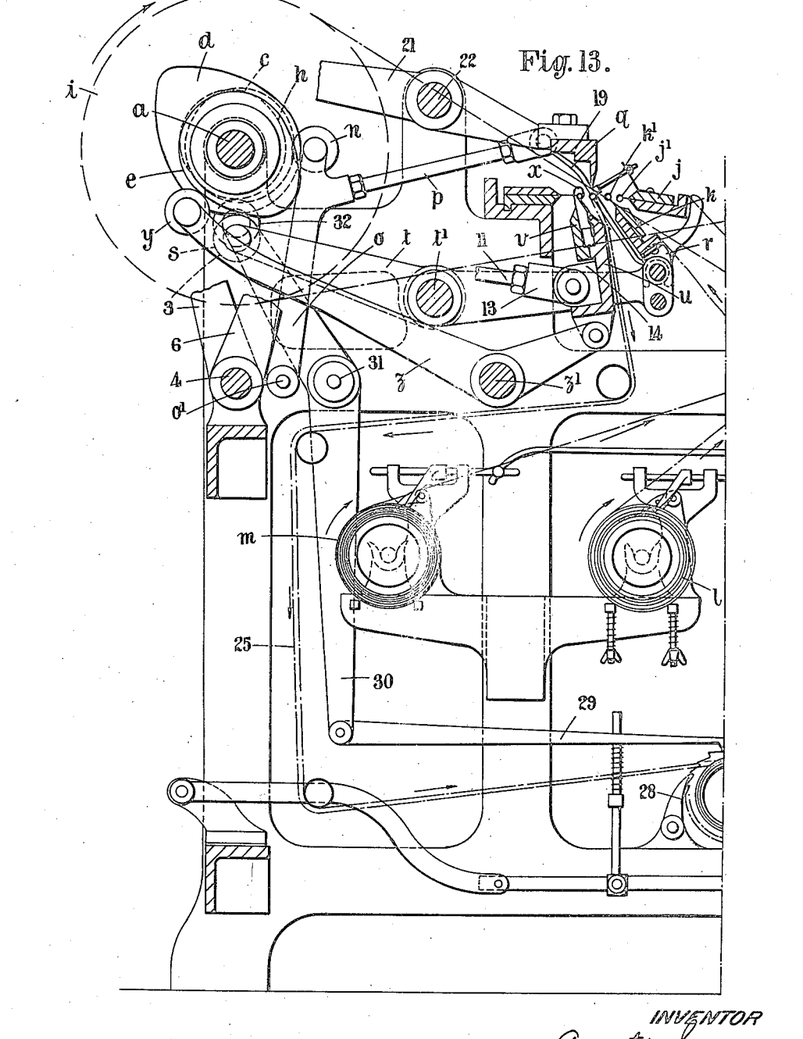
Fig. 13 is a similar view showing the needle holder plates, the actuating devices for the guide wires and sinkers and the rollers from which the threads are unwound and the roller on which the fabric is wound.
Figures 13, 14, 15, 16:
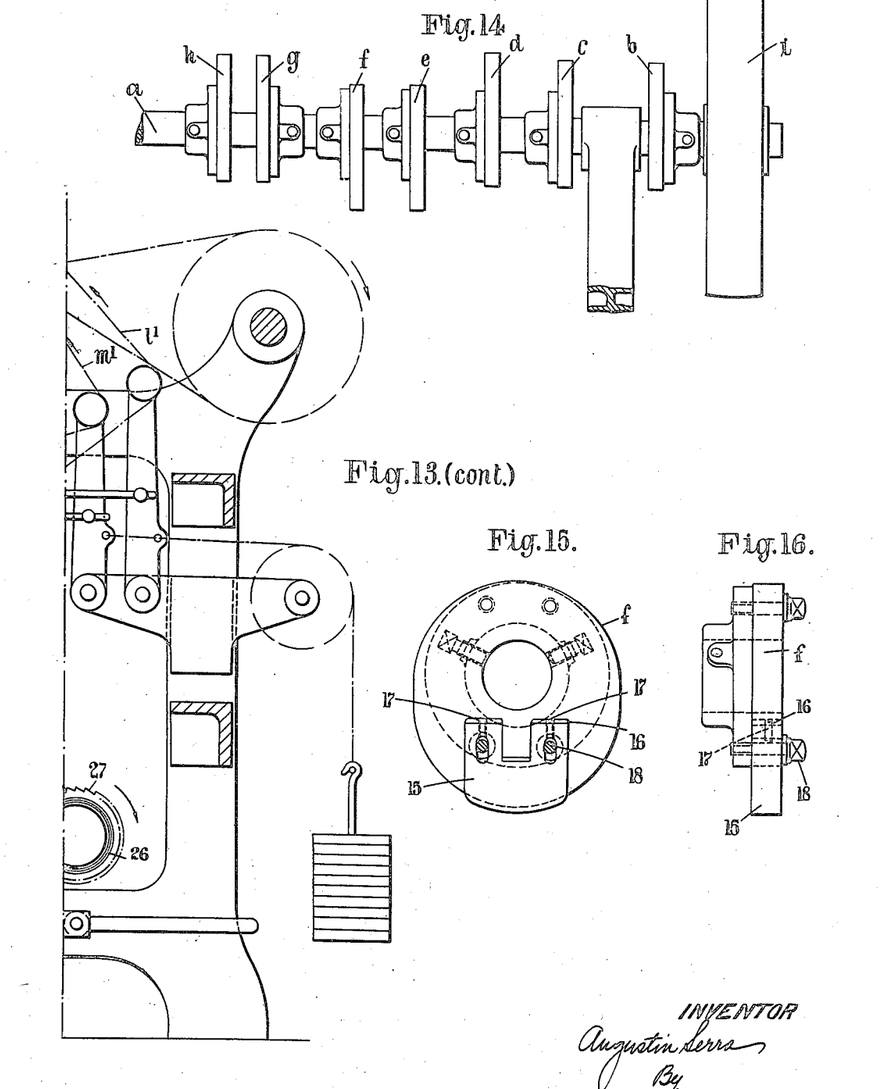
Fig. 14 is a front view of the cam shaft which effects the different movements of the machine.
Fig. 15 is a front view.
Fig. 16 is a side view to a larger scale of the adjustable cam which effects the lateral to-and-fro movements of the guide wire carriers.

Referring now to Figs. 12 and 13, $a$ indicates the cam shaft of a machine for rectilinear knitting on which are keyed the cams $b$, $c$, $d$, $e$, $f$, $g$, $h$, and the driving pulley $i$ serving to transmit the various movements. The dipping movements of the guide wire carriers $j$ $k$, of which the eyes of the guide wires J and K serve to guide the threads $l^1$ and $m^1$ from the beams $l$ and $m$ are effected by means of the cam $c$ which by pressing on a roller $n$ causes a lever $o$ pivoted at $o^1$ (Fig. 13) to oscillate.

Near its upper end this lever is connected to an adjustable rod $p$ connected in turn by means of a rod or blade $q$ to a support $r$ to which are fastened the carriers $j$ $k$. The return of these latter is effected by the action of the cam $d$ on a roller $s$ carried by a lever $t$ pivoted at $t^1$ to the frame of the machine and to the end of which is secured the support $r$. The movement given by the cam $d$ is greater than is usual in knitting machines, and serves not only for the formation of an open mesh but also for the purpose in combination with the means to be hereinafter described, of producing a stretching of the threads and the formation of a tightened node adapted to prevent laddering in the event of a thread being broken.

The raising of the plates $u$, $v$, which carry the sinkers $x$ is effected by means of the cam $e$ which through the medium of the roller $y$ cause the lever $z$ to pivot on its axis $z^1$. The horizontal to-and-fro movement of the said plates relatively to the frame of the machine (Figs. 2–6) is effected by means of the cams $f$, $g$, (Fig. 12). The first acts through the medium of a roller 2, on the lever 3 hinged at 4; the second acts through the roller 5 on the lever 6 also hinged at 4. The levers 3 and 6 are connected together by an arm 7 bent at a right angle at its end 8, and a spring 9 interposed between this bent end and a lug 10 of the lever 3, serves to compensate for the play produced by wear and ensures the desired quietness of movement of the levers. The transmission of the to-and-fro movement to the plates $u$, $v$, is effected by means of an adjustable rod 11, of which the heads 12, 13, are respectively connected to the lever 6, and to a lug 14 of the plate $u$.

The cams $f$ and $g$ have a radially adjustable block 15 lodged in a recess 16 of the cam. Adjustable bearing screws 17 and clamping screws 18 are provided to fasten the adjustable blocks in its set position. The said cams come into action when the stitches are about to be knocked off the needles immediately after the position shown in Fig. 5.

The presser 19 is actuated by the cam $h$ which imparts a dipping movement thereto through the medium of a roller 20 carried by a lever 21 hinged at 22, and of which the other end is secured to the support of the presser. The raising of this latter is effected by a spring 23 hooked at one end to the end of the lever 21 and at the other end to a hook 24 of the machine.

Figure 17:
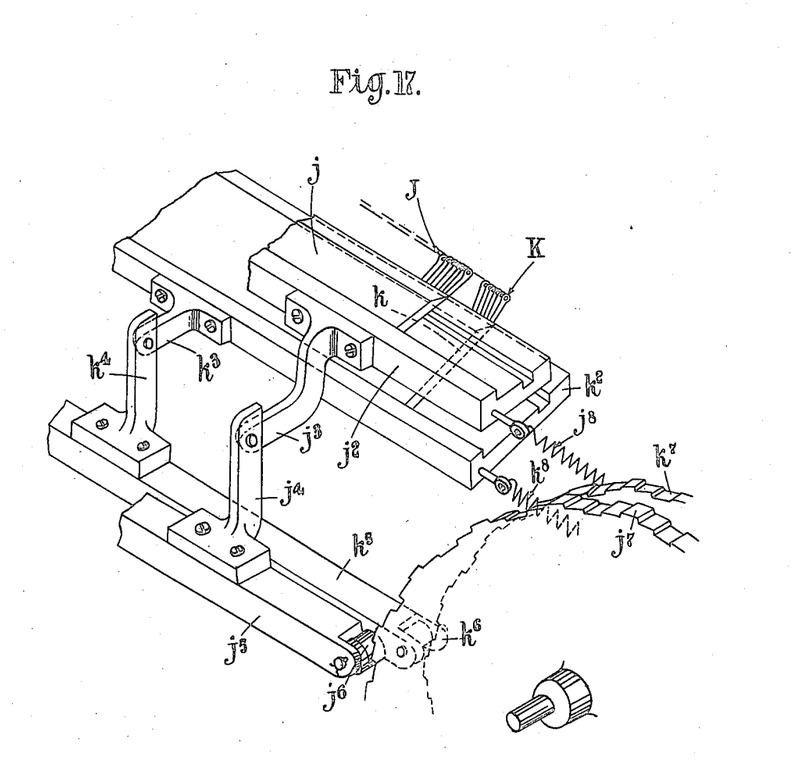
Fig. 17 is a perspective view illustrating diagrammatically the Dawson wheel and other mechanism which produces the lateral to-and-fro movements of the guide wire carriers.

Referring now to Fig. 17 which shows the shogging mechanism for effecting the to-and-fro movement of the guide wires in a plane perpendicular to that of the drawing Fig. 2, the plate $j$ is fixed on a bar $j^2$ movable in a slide on the machine; the plate $k$ is carried by a similar bar $k^2$. The bar $j^2$ is coupled by a double arm $k^3$ $k^4$ to a rod $k^5$ parallel to the rod $j^5$ and movable in the same slide. Each of the rods $j^5$, $k^5$, carries at its end a roller $j^6$, $k^6$, on which a Dawson wheel $j^7$, $k^7$, presses. The two discs comprising the Dawson wheel are keyed on the same shaft which has an intermittent rotary motion imparted to it. On the periphery of each disc steps are cut, the depth of each step corresponding with the distance which separates two consecutive needles W, the total depth corresponding to twice this distance. The speed ratios are calculated so that after each turn of the motor shaft of the machine, the shaft which carries the discs turns a fraction of a revolution such that the peripheries of the discs are displaced for a distance equal to the width of a step. It is to be noticed that to each projection on the disc $j^7$, there corresponds a recess on the disc $k^7$ and vice versa. The rollers, $j^6$ and $k^6$, are maintained pressed against the peripheries of the respective discs by springs $j^8$ and $k^8$ hooked to a part fixed to the frame of the machine.

The winding of the fabric is effected on a roller 26, provided with ratchet teeth 27, with a stop pawl 28 and a driving pawl 29. The latter is controlled by a lever 30, hinged at 31, and carrying at its end a roller 32, actuated by the cam $b$.

In known knitting machines there is provided a lifting device for the roller 26, arranged in such a manner that it does not exert any pulling effort on the fabric. According to the present invention on the contrary a strong pull is exerted on the fabric for the purpose of stretching the threads, and ensuring the tightening of the nodes. For this purpose a ratchet wheel 27 with teeth of small pitch for winding the fabric is employed.

I claim:—

1. An improved method of making a warp knitted fabric which consists in knitting it of two sets of left hand twisted threads, forming each individual thread into a series of closed loops, and causing each node to be formed by the intermeshing of a plurality of loops of separate threads, and pulling all the threads tight on the nodes.

2. A warp knitted fabric comprising two sets of left-hand twisted threads in which each individual thread is formed into a series of closed loops, each node is formed by the intermeshing of a plurality of loops of separate threads, and the threads are all pulled tight at the nodes.

3. A warp knitted fabric comprising two sets of left hand twisted threads in which each individual thread is formed into a series of closed loops, each node is formed by the intermeshing of a plurality of loops of separate threads, and the threads are all pulled tight at the nodes, said fabrics being slightly elastic longitudinally, and highly elastic transversely.

In witness whereof I have affixed by hand in presence of two witnesses.

AUGUSTIN SERRA.

Witnesses:
H. B. DILEY,
G. YOUNG.